Dec. 19, 1933.　　　　C. J. ULRICH　　　　1,940,032
MOISTURE RESPONSIVE CIRCUIT CONTROLLER
Filed June 13, 1930　　　　2 Sheets-Sheet 1
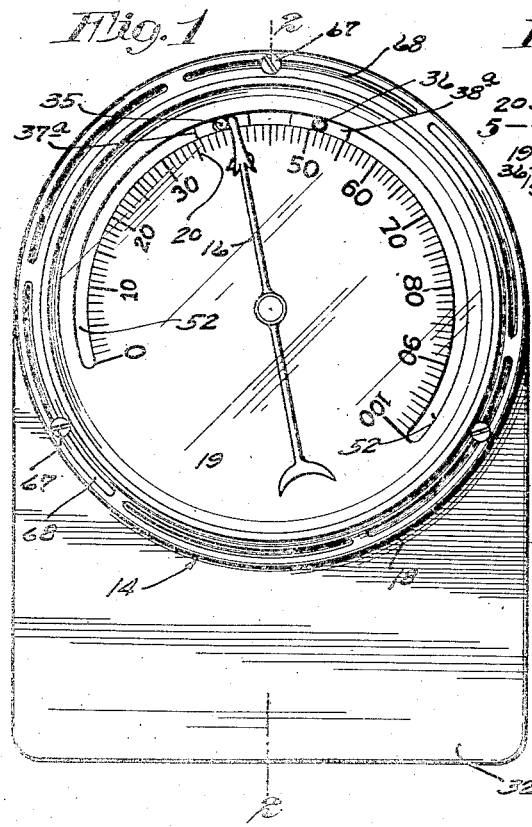
Inventor
Carl J. Ulrich
By his Attorneys Dec. 19, 1933.  C. J. ULRICH  1,940,032
MOISTURE RESPONSIVE CIRCUIT CONTROLLER
Filed June 13, 1930   2 Sheets-Sheet 2
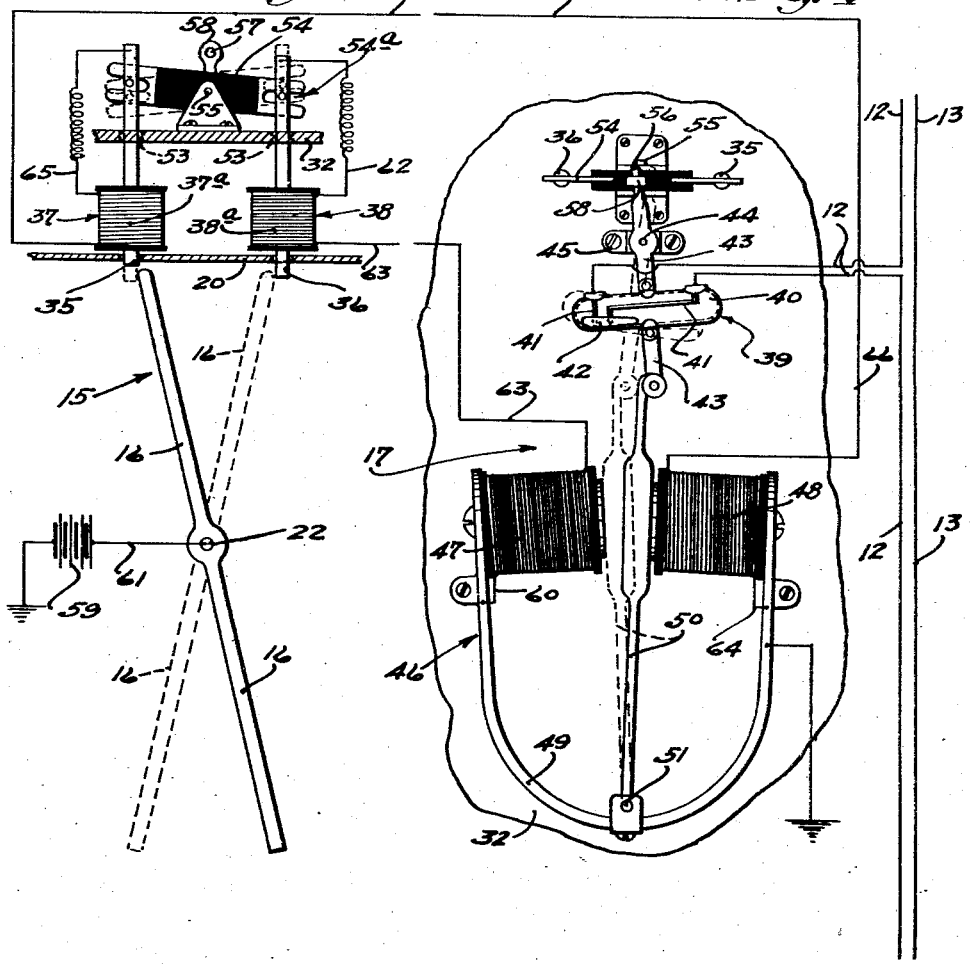
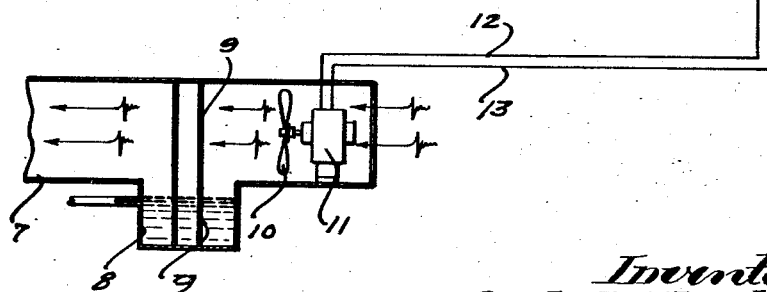
Inventor
Carl J. Ulrich
By his Attorneys Patented Dec. 19, 1933

1,940,032

UNITED STATES PATENT OFFICE 1,940,032

MOISTURE RESPONSIVE CIRCUIT CONTROLLER

Carl J. Ulrich, Minneapolis, Minn., assignor of one-half to Philip E. Carlson, Minneapolis, Minn.

Application June 13, 1930. Serial No. 460,917

10 Claims. (Cl. 175—375)

My present invention relates to a moisture responsive circuit controlling device and is especially adapted for use in connection with humidifiers. An object of the invention is the provision of a simple and highly efficient device of the class described which will automatically control the action of a humidifier in response to changes in the amount of humidity or moisture in the air and thereby cause the humidifier to maintain the humidity or moisture substantially constant.

Generally stated, the invention consists of the novel devices, combinations of devices and arrangements of parts hereinafter described and defined in the claims.

Certain of the subject-matter disclosed in this application is broadly claimed in a co-pending application Serial Number 625,311, filed by me of date July 28, 1932, as a continuation in part of the present application, entitled "Indicating circuit controller."

In the accompanying drawings, which illustrate the invention, like characters indicate like parts throughout the several views.

Referring to the drawings:

Fig. 1 is a front elevation of the complete device;

Fig. 2 is a section taken on the line 2—2 of Fig. 1, some parts being shown in full and some parts being broken away;

Fig. 3 is a section taken on the line 3—3 of Fig. 2;

Fig. 4 is a detail sectional view taken on the line 4—4 of Fig. 2, some parts being broken away and showing part of the complete wiring diagram;

Fig. 5 is a view partly in detail and partly in diagram of the primary or low tension switch mechanism, those parts shown in detail being sectioned on the line 5—5 of Fig. 2 and said figure further including part of the complete wiring diagram apparatus; and Fig. 6 is a view diagrammatically illustrating a conventional type of humidifier and also part of the complete wiring diagram.

The humidifier to be controlled may be of any suitable type that can be controlled electrically but is here illustrated as comprising an air duct 7 that is open at its opposite ends, a water tank 8 below and opening into the duct 7, perforated wicks 9 that extend across the inside of the air duct 7 and into the water Y in the pan 8, and a motor-driven fan 10, the motor of which is indicated by the numeral 11. In this type of humidifier, water absorbed by the wicks 9 climbs upward into the air duct 7 by capillary attraction and is evaporated therefrom into air circulated through the air duct 7, the delivery end of which air duct 7 communicates with the room in which the controlling device is located. It will be apparent that when the fan is operated, air will be circulated through the duct 7 quite rapidly and will therefore absorb and carry away a great deal of moisture from the wicks 9 but when the fan is inoperative there will be little or no circulation of air through the duct 7 and therefore little, if any, moisture taken from the humidifier and delivered to the room. The fan motor 11 may be supplied with current from any suitable source, not shown, through leads 12 and 13 but for the purpose of this case, the leads 12 and 13 may be assumed to connect to a relatively high tension source such as 110 volt electric light line, not shown, and therefore these leads will be hereinafter referred to as high tension leads.

The moisture responsive controlling mechanism includes a conventional well-known type of hygrometer 14, a low current primary switch mechanism 15 including the hygrometer needle or indicator 16, and a heavy current secondary switch mechanism 17. The hygrometer 14 comprises a perforated cylindrical casing 18 having a transparent glass face 19, a graduated dial 20, the said indicating needle or point 16, and a moisture responsive needle actuating mechanism 21. The indicating needle 16 is mounted on and for movements with a pivoted spindle 22. The needle actuating mechanism 21 comprises a frame 23 secured to the back of the dial 20, a pulley 24 fast on the spindle 22, moisture responsive elements 25 and 26, opposed intermediately pivoted levers 27 and 28, a light thread-like cable 29, and a light tension spring 30. The moisture responsive elements 25 and 26 may be of any suitable substance but are preferably made up of strands of human hair because of their extreme sensitiveness to moisture. The hairs 25 are anchored at one end of the frame 23 at 31 and are attached at their other ends to one end of the intermediately pivoted lever 27 and the hairs 26 are attached to the other end of the intermediately pivoted lever 27 and at their other ends to one end of the lever 28. The cable 29 runs over the pulley 24 and extends between the end of the lever 28 opposite the side to which the hairs 26 are attached and one end of the light tension spring 30, the other end of which spring is attached to the frame 23. The spring 30 at all times maintains a light tension on the hairs 25 and 26.

As the moisture in the air increases, the hairs 25 and 26 will expand and become elongated and the spring 30 will take up the slack by moving the cable 29 in its direction. This movement of the cable 29 will cause the pulley 24 and needle 16 to rotate therewith in clockwise direction in respect to Fig. 1 and said needle will indicate, on the graduated dial 20, the increase in relative humidity. As the moisture in the room decreases, the hairs 25 and 26 contract or shorten and will move the cable 29 in the opposite direction thus causing the needle to move in an anti-clockwise direction and indicate, on the graduated dial, the decrease in relative humidity.

The casing 14 is mounted on the front of a casing 32, which casing 32 is preferably mounted on a wall or the like 33 by means of screws 34. Attention should here be called to the fact that the complete hook-up of the device and the hook-up thereof to the humidifier is not shown in any single figure, but is shown diagrammatically in Figs. 4 to 6 inclusive, the diagrammatic lead lines being broken between the figures.

The low current primary switch 15 is in the nature of a single-pull, double-throw switch. The needle 16 of the hygrometer is the movable contact or switch arm of the switch 15 and is alternately closable with retractable spaced contacts 35 and 36, which contacts are floating plunger-acting cores of electro-magnets 37 and 38, respectively, the coils of which electro-magnets are indicated by the numerals 37a and 38a, respectively. The retractable plunger contacts 35 and 36 constitute part of the primary switch 15.

The heavy current secondary switch mechanism 17, as illustrated best in Fig. 4, includes an oscillatory mercury bulb switch 39 comprising a glass bulb 40, fixed electrodes 41 interposed in the supply lead 12 of the motor 11 and a globule of mercury 42, which mercury shifts to the lowermost portion of the bulb 40 when the bulb 40 is oscillated in one direction and makes contact between the electrodes and when turned in the other direction breaks the contact between the electrodes. This bulb 40 is mounted on and for movements with an oscillatory lever 43 that is intermediately pivoted at 44 to a bracket 45 carried by and projected inward from the front of the casing 32. This secondary switch mechanism 17 further includes a secondary switch actuator 46 comprising opposed electro-magnets 47 and 48 respectively, the south poles of which magnets are connected by an iron pole strap 49. Pivoted to the intermediate portion of the strap 49 and projecting upward between the poles of the magnets 47 and 48 is a magnetically influenceable lever 50. The pivotal connection between the lever 50 and the strap 49 is indicated by 51. The pole strap 49 and lever 50, of course, represent the south poles of the magnets 47 and 48 and will, therefore, when one of said magnets is energized, be attracted by the north pole of the energized magnet and repelled by the pole of the inoperative magnet which will then become part of the south pole of the operative magnet.

The field coils 37a and 38a of the magnets 37 and 38 are mounted on the outer face of the casing 32 and projected into the upper portion of the hygrometer casing 14 and the floating magnet cores or retractable primary switch contacts 35 and 36 work through a segmental slot 52 in the dial 50 of the hygrometer and holes 53 in the front of the casing 32. The primary switch contacts 35 and 36 are coupled together for simultaneous movements in opposite directions by a rocking arm 54 that is pivoted at its central portion to the casing 32 at 55 and which, near its opposite ends at 58a has slot and pin engagement with the retractable contacts 35 and 36. One of the contacts 35 or 36 is thus always in a retracted position where it is out of the path of travel of the primary switch arm or hygrometer needle 16 and the other thereof is always extended into the path of travel of the hygrometer needle 16. This simultaneous retracting of one of the contacts 35 and 36 and extending of the other thereof is accomplished automatically by projecting the upper end portion 56 of the lever 43 through an eye 57 in a lug 58 that projects transversely outward from the pivot point 55 of the rock arm 54. Thus when the secondary switch 39 is closed by the magnet 48, the retractable contact 35 will be in a retracted position and the contact 36 will be extended and when the switch is opened by the magnet 47 the primary switch contact 35 will be extended and the contact 36 retracted, as shown in Figs. 4 and 5.

The supply circuit for the magnet 47, of the secondary switch actuating mechanism 46, includes a low tension source of current 59, which may be assumed for the purpose of this case to be in the form of a battery. One side of this battery is connected to one side of the magnet 47 through ground, the pole strap 49 and a short lead 60. The other side of the battery is adapted to be connected to the other side of the magnet 47 through a lead 61, the hygrometer needle primary switch arm 16, the retractable contact 36, a flexible lead 62, the field coil 38a of the magnet 38 and a lead 63. The supply circuit for the magnet 48 of the secondary switch actuating mechanism 46 includes ground connection from one side of the battery 59 to the strap 49 and a lead 64 from the strap 49 to one side of the magnet 48. The other side of the battery 59 is adapted to be connected to the other side of the magnet 48 by the lead 61, the primary switch arm 16, the retractable contact 35, a flexible lead 65, the coil 37a of the magnet 36, and a lead 66.

Under operating conditions, the hygrometer needle or primary switch arm 16 will in response to variations in the humidity in the air or moisture content thereof, move back and forth between and alternately establish contact with the retractable contacts 35 and 36 which contacts are, as previously stated, the floating cores of the magnets 37 and 38, respectively. Attention should here be called to the fact that the needle 16 or at least the contact end portion thereof is of soft iron and is subject to magnetic influence of the magnetic cores or contacts 35 and 36.

It will be apparent that when the needle 16 contacts with its cooperating primary switch contact 36, as shown by dotted lines in Fig. 5, the supply circuit through the magnet 47 will be closed and the secondary switch 39 will be moved to the position, shown by dotted lines in Fig. 4, in which position the high tension supply circuit to the humidifier motor 11 will be opened, thus causing the humidifier to be substantially inoperative and when the hygrometer needle 16 comes into contact with its cooperating contact 35, as shown by full lines in Fig. 5, the supply circuit to the magnet 48 will be closed and the secondary switch 39 will be moved to the position shown by full lines in Fig. 4 and will close the circuit through the humidifier motor 11 and cause the humidifier to become operative.

The variations in relative humidity will therefore depend upon the spacing of the contacts 35 and 36 and in practice I have found the desired spacing to be about ten points on the hygrometer dial, as shown best in Fig. 1, wherein the hygrometer needle is shown as being operative between 40 and 50 per cent relative humidity and the controlling device will, when used in connection with an efficient humidifier, so regulate the humidifier as to maintain the relative humidity between 40 and 50 per cent or an average relative humidity of 45 per cent. The device may, however, readily be adjusted to maintain the humidity between any ten points on the dial.

It will be noted that the entire hygrometer casing is mounted on the front face of the case 32 by screws 67 that work through a slot 68 in the edge of the hygrometer casing. By loosening or removing the screws 67, the entire hygrometer may be turned so that the graduation on the dial 20, indicating the desired average humidity, is between the primary switch contacts 35 and 36. The screws, of course, then being replaced to maintain the hygrometer in the desired set position. The contacts 35 and 36, because they work through the segmental slot 52 in the dial 20, will not be affected by movement or setting of the hygrometer to the desired position.

Operation

The description of the operation will start at the point of low humidity wherein the parts of the device are in the position shown by full lines in the drawings and in which position the secondary switch 39 is closed thereby closing the circuit through the motor 11 so that the humidifier is in operation. It should be here noted that in this position the contact 35 is retracted away from the needle 16 and the contact 36 is extended into the path of travel of the needle 16. As the humidifier continues its operation, it will increase the relative humidity in the room and the hygrometer needle 16 will respond to the increase in humidity and move up the scale toward the contact 36. This movement is, of course, quite slow and the pressure exerted thereon is quite feeble. When, however, the moisture in the air is increased approximately to the desired maximum, the needle 16 will make a feeble contact with the primary switch contact 36 which will momentarily complete the supply circuit to the magnet 47 through the field of the magnet 38.

The momentary contact, while feeble, is sufficient to energize the magnetic field coil 38 and create a magnetic field about the end of the magnetic core or contact 36 which will draw the needle 16 tightly thereagainst and thus form a sufficiently tight contact to operate the magnet 47 of the secondary switch actuating mechanism. Of course, when the magnet 47 becomes energized the lever 50 will be drawn thereto and will move the switch 39 to its open position, as shown by dotted lines in Fig. 4 and when the switch 39 is moved to its open position the upper end portion 56 of the lever 43 will move the rock arm 54 to the position shown by dotted lines in Fig. 5 and the contact 36 of the primary switch 15 will be retracted away from the needle 16 and the needle 35 will be extended. The retracting of the contact 36 from the needle 16 will, of course, break the circuit through the magnet 47. The humidifier is now in-operative and therefore the relative humidity in the room will immediately begin to decrease and as the humidity decreases the hygrometer needle will respond to the decrease and move back down the scale toward the contact 35. When the needle 16 makes its first feeble contact with the contact 35, which is, of course, as explained, in an extended position, the magnetic field coil 37ª of the magnet 37 will become energized and will set up a magnetic field that will instantly draw the needle 16 in tight engagement therewith and the supply circuit through the magnet 48 of the secondary actuating mechanism 46 will become energized and will cause the secondary switch 39 to close the circuit through the humidifier motor 11 and set the humidifier again into action and simultaneously with the closing of the switch 39, the primary switch contact 35 will be retracted away from the needle 16 and break the supply circuit through the magnet 47 and the contact 36 of the primary switch will be extended.

It will be apparent that this moisture influenced circuit controller, when used in connection with a humidifier, will control the same much as the conventional thermostat coupled to a heating plant controls the heat in a room or building. In this device the feeble action of the hygrometer is only employed to momentarily close the circuit, or in other words to close the circuit through an electro-magnet which thereafter tightly closes and maintains the circuit closed through the secondary switch actuating mechanism during the operation thereof. The action of these magnets is so quick that there is no arcing or sparking between the needle 16 and contacts 35 or 36 and therefore there is no apparent corrosion or deterioration between the contacts 35 or 36 and needle 16. Also, these contacts are automatically cleaned by the wiping action of the contacts on the needle when they are retracted therefrom, which keeps the contacts well polished.

In case the hygrometer is set to maintain the humidity at a point considerably above or considerably below the humidity in the room at the time of setting, the needle 16 will, of course, be moved out of its operative zone between the retractable contacts 35 and 36 but will, when the humidity increases or decreases approximately to the desired extent, automatically move into the operating zone between the contacts at which time it will begin to act as a controlling switch. It may sometimes happen that the needle 16 will be moved, when setting, to the outside of a projected contact 35 or 36, in which instance it will, when the approximate desired humidity is reached, engage the outside portion of the projected contact and close the circuit through said contact and its cooperating magnets 47 or 48 and cause the secondary switch 39 to reverse its position and the projected contact 35 or 36 to be retracted. In this manner the positions of the contacts 35 and 36 and the position of the secondary switch mechanism will be automatically corrected and the mechanisms will function in the usual manner thereafter.

The casing 32, it will be noted, is of insulating material and does therefore afford an insulated mounting base for the various parts of the apparatus. The magnets 47 and 48 are secured to the inner front side of the casing 32 by a screw or the like, as illustrated best in Fig. 4. The rock arm 54, it will be noted by the drawings especially in Fig. 5, is electrically insulated between its opposite ends.

It will be obvious that the apparatus described is one which is sensitive to changes in atmospheric conditions.

What I claim is:

1. A moisture responsive circuit controller comprising a secondary switch adapted to be interposed in a circuit to be controlled, actuating elements for said secondary switch one operative to close the same and the other thereof operative to open the same, supply circuits for said actuating elements, a moisture responsive element, spaced electromagnets having floating plunger-like cores, the field coils of said magnets being connected in series with its core and each serially connected magnetic core and field being interposed in one of said actuating element circuits, and a pivoted primary switch arm interposed in both of said actuating element circuits and operative by said moisture responsive element between said retractable magnetic cores to alternately close the secondary switch actuating element circuits, said magnetic cores being operatively connected to said secondary switch actuating elements so that the last used magnetic pole will be retracted thereby away from the primary switch arm and break the supply circuit therethrough and its magnetic field and secondary switch actuating element at the completion of an operation of its cooperating actuating element and the other of said cores being simultaneously extended into operative position.

2. A moisture responsive circuit controller comprising a secondary switch adapted to be interposed in a circuit to be controlled, actuating elements for said secondary switch, each including an electromagnet, one of said magnets being arranged to close the secondary switch and the other thereof to open said secondary switch, a supply circuit for each of said electromagnets, spaced primary switch contacts, one in each of said electromagnet supply circuits, a moisture responsive element, a primary switch arm interposed in a supply lead to said circuits and subject to the action of said moisture responsive element, and adapted to be moved thereby between said spaced contacts to alternately close said circuits, and means operative when said switch arm makes its first slight contact with one of said spaced contacts to maintain non-arcing contact between said primary switch arm and the said spaced contact during the complete operation of the electromagnet in circuit therewith, and to break the circuit through said magnet upon completion of its operation.

3. A moisture responsive circuit controller comprising a secondary switch adapted to be interposed in a circuit to be controlled, actuating elements for said secondary switch, one operative to close the same and the other thereof operative to open the same, supply circuits for said elements, a moisture responsive element, a pivoted primary switch arm subject to the action of said moisture responsive element and adapted to be moved pivotally thereby and being connected in both of said actuating element supply circuits, spaced electromagnets having floating plunger-acting cores adapted to be projected into or retracted away from the path of travel of said switch arm, the coils of said magnets being connected in series with their respective cores and each serially connected magnet and core being interposed in one of said actuating element circuits, an intermediately pivoted rock arm operatively connected near its ends to said plunger-acting magnet cores whereby each core will be caused to move simultaneously with the other thereof but in the opposite direction, whereby one of said cores always will be projected into the path of travel of said primary switch arm and the other thereof retracted out of the path of travel of the switch arm, said magnet cores acting as retractable primary switch contacts cooperative with the primary switch arm to close the circuits through said actuating elements and when touched by the primary switch arm will attract the said switch arm tightly thereagainst and maintain non-arcing engagement therebetween during the complete operation of the actuating element in circuit therewith, and a mechanical connection between said secondary switch actuating element and the rock arm connection between the spaced plunger-like magnet cores operative to rock said arm in a direction to retract the energized magnet pole away from the switch arm and break the circuit at the completion of an operation and project the other of said magnet cores into the path of travel of said switch arm.

4. The combination with a secondary switch that is adapted and arranged to be inserted into a circuit to be controlled, electrical actuating elements for said secondary switch one operative to close the same and the other operative to open the same, supply circuits for said secondary switch actuating elements, a primary switch including spaced contacts and a cooperating switch arm movable between said contacts, means for moving the primary switch arm from one position to another, said primary switch contacts being interposed one in each of said secondary switch actuator supply circuits and said primary switch arm being common to both of said circuits, said primary switch contacts being movable into and out of the path of travel of said primary switch arm, and means operative to move a last contacted of said spaced contacts out of the path of travel of said primary switch arm upon completion of an operation of its cooperating secondary switch operator and to simultaneously move the other thereof into the path of travel of said primary switch arm.

5. A moisture responsive circuit controller including a secondary switch that is adapted and arranged to be inserted into a circuit to be controlled, electrical actuating elements for said secondary switch one operative to open the same and the other operative to close the same, supply circuits for said actuating elements, a primary switch including spaced contacts and a cooperating switch arm movable between said contacts, and a moisture responsive element for operating said primary switch arm, said primary switch contacts being interposed one in each of said secondary switch actuator supply circuits and said primary switch arm being common to both of said circuits, said primary switch contacts being movable into and out of the path of travel of said primary switch arm, and means operative to move a last contacted of said spaced contacts out of the path of travel of said primary switch arm upon completion of an operation of its cooperating secondary switch operator and to simultaneously move the other thereof into the path of travel of said primary switch arm.

6. The structure defined in claim 4 in which the said primary switch contacts are magnetic and the primary switch arm is subject to magnetic influence.

7. The structure defined in claim 5 in which the primary switch contacts are magnetic and the primary switch arm is subject to magnetic influence.

8. A circuit controller including spaced contacts, switch arm means movable between the spaced contacts, means sensitive to changes in atmospheric conditions and operative to move the switch arm means between the spaced contacts in response to changes in atmospheric conditions, said spaced contacts being movable into and out of the path of travel of said switch arm means, and means operative to move the last engaged of said spaced contacts out of engagement with the switch arm means and to simultaneously move the other thereof into the path of travel of the switch arm means, whereby to break contact between the switch arm means and last engaged of said spaced contacts and permit continued movement of the switch arm means therebeyond.

9. The combination with a secondary switch that is adapted to be interposed in a circuit to be controlled, actuating means for the secondary switch operative to move the same from one position to another and including an electrical element, a primary switch including a switch arm and a co-operating contact that is movable into and out of the path of travel of the switch arm, means sensitive to changes in atmospheric conditions and operative to move the switch arm from a position spaced from its co-operating contact into engagement with and beyond said contact in response to changes in atmospheric conditions, a supply circuit for the electrical element of said secondary switch-actuating means including the primary switch arm and its co-operating contact, and means controlled by the secondary switch-actuating means operatively arranged to retract the primary switch contact out of engagement with and out of the path of travel of its co-operating switch arm, upon completion of an operation of the secondary switch whereby to break the circuit through the electrical element of the secondary switch actuator and to permit continued movement of the primary switch arm beyond its co-operating contact.

10. The structure defined in claim 9 in further combination with an electro-magnetic coil interposed in the circuit of the secondary switch actuator, said primary switch contact being of magnetic influenceable material and said electro-magnetic coil being located in magnetizable relationship to said primary switch contact.

CARL J. ULRICH.